(12) United States Patent
Hasan al Banna (10) Patent No.: US 10,923,137 B2
(45) Date of Patent: Feb. 16, 2021

(54) SPEECH ENHANCEMENT AND AUDIO EVENT DETECTION FOR AN ENVIRONMENT WITH NON-STATIONARY NOISE

(71) Applicant: Robert Bosch GmbH, Stuttgart (DE)

(72) Inventor: Taufiq Hasan al Banna, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/586,876

(22) Filed: May 4, 2017

(65) Prior Publication Data

US 2017/0323653 A1 Nov. 9, 2017

Related U.S. Application Data

(60) Provisional application No. 62/332,622, filed on May 6, 2016.

(51) Int. Cl.
| | | |
|---|---|---|
| *G10L 15/20* | (2006.01) | |
| *G10L 25/84* | (2013.01) | |
| *G10L 25/93* | (2013.01) | |
| *G10L 21/0216* | (2013.01) | |
| *G10L 21/0364* | (2013.01) | |
| *G10L 15/26* | (2006.01) | |
| *G10L 25/30* | (2013.01) | |

(52) U.S. Cl.
CPC .......... *G10L 21/0216* (2013.01); *G10L 15/20* (2013.01); *G10L 15/26* (2013.01); *G10L 21/0364* (2013.01); *G10L 25/30* (2013.01); *G10L 25/84* (2013.01); *G10L 25/93* (2013.01)

(58) Field of Classification Search
CPC .......... G10L 15/20; G10L 25/84; G10L 25/93
See application file for complete search history.

(56) References Cited

U.S. PATENT DOCUMENTS

| | | | |
|---|---|---|---|
| 7,590,530 B2 | 9/2009 | Zhao et al. | |
| 8,073,689 B2 | 12/2011 | Hetherington et al. | |
| 8,612,222 B2 | 12/2013 | Hetherington et al. | |
| 8,949,120 B1 | 2/2015 | Every et al. | |
| 9,892,344 B1* | 2/2018 | Tran ........................ | G06K 9/66 |

(Continued)

FOREIGN PATENT DOCUMENTS

| | | |
|---|---|---|
| EP | 1580730 | 9/2005 |
| EP | 3057097 | 8/2016 |

OTHER PUBLICATIONS

Cohen and B. Berdugo, "Speech enhancement for non-stationary noise environments," Signal Process, vol. 81, pp. 2403-2418, 2001.

(Continued)

*Primary Examiner* — Bryan S Blankenagel
(74) *Attorney, Agent, or Firm* — Kathy K. Takeguchi; Maginot, Moore & Beck LLP (57) ABSTRACT

A computer-implemented system and method provide an audio label for a noise signal. The computer-implemented system and method include receiving an audio input and obtaining the noise signal from the audio input. The computer-implemented system and method include extracting audio features of the noise signal. The computer-implemented system and method include determining and outputting an audio label for the extracted audio features of the noise signal based on machine learning data.

18 Claims, 8 Drawing Sheets

(56) References Cited

U.S. PATENT DOCUMENTS

| | | | | |
|---|---|---|---|---|
| 9,961,435 | B1* | 5/2018 | Goyal | H04R 1/1083 |
| 2005/0125223 | A1* | 6/2005 | Divakaran | G06K 9/00711 |
| | | | | 704/223 |
| 2006/0031066 | A1* | 2/2006 | Hetherington | G10L 21/0208 |
| | | | | 704/226 |
| 2009/0198492 | A1* | 8/2009 | Rempel | G10L 15/20 |
| | | | | 704/233 |
| 2012/0085741 | A1* | 4/2012 | Holverson | B23K 9/0953 |
| | | | | 219/136 |
| 2014/0254816 | A1* | 9/2014 | Kim | H04M 9/082 |
| | | | | 381/71.11 |
| 2014/0328486 | A1* | 11/2014 | Gopinath | H04R 3/00 |
| | | | | 381/56 |
| 2015/0066499 | A1 | 3/2015 | Wang et al. | |
| 2015/0095026 | A1* | 4/2015 | Bisani | H04R 3/005 |
| | | | | 704/232 |
| 2015/0172842 | A1* | 6/2015 | Nakamura | H04R 29/004 |
| | | | | 381/92 |
| 2015/0235651 | A1* | 8/2015 | Sharifi | G10L 15/20 |
| | | | | 704/233 |
| 2015/0380013 | A1* | 12/2015 | Nongpiur | G10L 25/51 |
| | | | | 704/231 |
| 2016/0005422 | A1 | 1/2016 | Zad Issa et al. | |
| 2016/0232915 | A1* | 8/2016 | Lepauloux | G10L 21/0208 |
| 2016/0284346 | A1* | 9/2016 | Visser | G10L 15/16 |
| 2016/0284349 | A1* | 9/2016 | Ravindran | G10L 15/20 |
| 2017/0092268 | A1* | 3/2017 | Kristjansson | G10L 15/20 |
| 2017/0125038 | A1* | 5/2017 | Hassani | G10L 15/063 |
| 2017/0152729 | A1* | 6/2017 | Gleitman | E21B 41/00 |
| 2017/0178667 | A1* | 6/2017 | Hofer | G10L 25/51 |
| 2017/0289768 | A1* | 10/2017 | Wan | H04W 4/70 |
| 2018/0211670 | A1* | 7/2018 | Gorodetski | G10L 17/04 |

OTHER PUBLICATIONS

D. Malah, R. V. Cox and A. J. Accardi, "Tracking speech-presence uncertainty to improve speech enhancement in non-stationary noise environments," in Acoustics, Speech, and Signal Processing, 1999. Proceedings., 1999 IEEE International Conference on, 1999, pp. 789-792.

S. Chang, Y. Kwon, S. Yang and I. Kim, "Speech enhancement for non-stationary noise environment by adaptive wavelet packet," in Acoustics, Speech, and Signal Processing (ICASSP), 2002 IEEE International Conference on, 2002, pp. I-561-I-564.

S. Rangachari and P. C. Loizou, "A noise-estimation algorithm for highly non-stationary environments," Speech Commun., vol. 48, pp. 220-231, 2006.

T. Gao, J. Du, Y. Xu, C. Liu, L. Dai and C. Lee, "Improving deep neural network based speech enhancement in low SNR environments," in Latent Variable Analysis and Signal Separation Anonymous Springer, 2015, pp. 75-82.

Y. Xu, J. Du, L. Dai and C. Lee, "Dynamic noise aware training for speech enhancement based on deep neural networks," in Proc. Interspeech, 2014, pp. 2670-2674.

Y. Xu, J. Du, L. Dai and C. Lee, "An experimental study on speech enhancement based on deep neural networks," 2014, pp. 65-68.

T. Gao, J. Du, L. Xu, C. Liu, L. Dai and C. Lee, "A unified speaker-dependent speech separation and enhancement system based on deep neural networks," in Signal and Information Processing (ChinaSIP), 2015 IEEE China Summit and International Conference on, 2015, pp. 687-691.

G. Hinton, L. Deng, D. Yu, G. E. Dahl, A. Mohamed, N. Jaitly, A. Senior, V. Vanhoucke, P. Nguyen and T. N. Sainath, "Deep neural networks for acoustic modeling in speech recognition: The shared views of four research groups," IEEE Signal Processing Magazine, vol. 29, pp. 82-97, 2012.

S. Davis and P. Mermelstein, "Comparison of parametric representations for monosyllabic word recognition in continuously spoken sentences," IEEE Trans. on Acoust. Speech and Signal Process., vol. 28, pp. 357-366, 1980.

G. E. Hinton, S. Osindero and Y. Teh, "A fast learning algorithm for deep belief nets," Neural Comput., vol. 18, pp. 1527-1554, 2006.

Y. Xu, J. Du, L. Dai, and C. Lee. "A Regression Approach to Speech Enhancement Based on Deep Neural Networks." IEEE/ACM Transactions on Audio, Speech, and Language Processing. vol. 23, No. 1, Jan. 2015, pp. 7-19.

Espi Miquel et al: "Spectrogram patch based acoustic event detection and classification in speech overlapping conditions", 2014 4th Joint Workshop on Hands-Free Speech Communication and Microphone Arrays (HSCMA), IEEE, May 12, 2014 (May 12, 2014), pp. 117-121.

* cited by examiner

SPEECH ENHANCEMENT AND AUDIO
EVENT DETECTION FOR AN
ENVIRONMENT WITH NON-STATIONARY
NOISE

CROSS-REFERENCE TO RELATED APPLICATION

This application claims the benefit of U.S. Provisional Patent Application No. 62/332,622, which was filed on May 6, 2016, and which is hereby incorporated herein by reference in its entirety.

FIELD

This disclosure relates generally to acoustics, and more particularly to speech enhancement and audio event detection.

BACKGROUND

Unless otherwise indicated herein, the materials described in this section are not prior art to the claims in this application and are not admitted as prior art by inclusion in this section.

In an environment with background noise, a communication device with a microphone may transmit background noise components in addition to speech components. In these instances, the background noise components may interfere with the speech components. In turn, this interference may make it difficult for acoustic technology, such as automatic speech recognition technology (ASR) or other types of technologies, to provide effective results.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a computer-implemented method includes at least one computer processor, which is configured to obtain a noise signal from an audio input. The computer-implemented method includes extracting, via the at least one computer processor, audio features of the noise signal. The computer-implemented method includes determining and outputting, via the at least one computer processor, an audio label for the audio features of the noise signal based on neural network data related to a first neural network model.

In an example embodiment, a computer system includes at least one computer processor configured to (a) obtain a noise signal from audio input, (b) extract audio features of the noise signal, and (c) determine and output an audio label for the audio features of the noise signal based on neural network data related to a first neural network model. The computer system includes at least one computer readable medium, which stores the neural network data of the first neural network.

These and other features, aspects, and advantages of the disclosure are further clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction and arrangement of the components without departing from the disclosed subject matter or without sacrificing one or more of its advantages. Indeed, the described forms of these embodiments are merely explanatory, these embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1A:
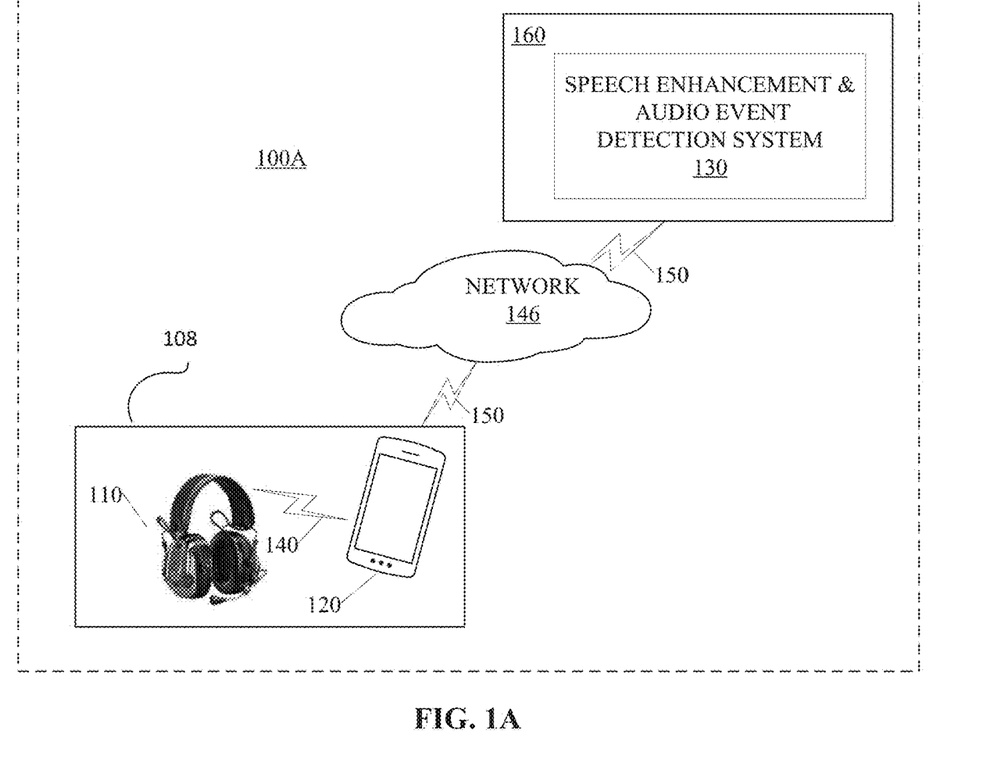
FIG. 1A is an illustration of an exemplary speech enhancement and audio event detection system according to an example embodiment of the described disclosure.

FIG. 1A illustrates an example embodiment of a system 100A that includes at least one computing system 108, at least one speech enhancement and audio event detection system 130, and at least one server system 160 (or any suitable computer system 160). In addition to these components, the system 100A also includes at least one communication link 140, at least one communication network 146, and at least one communication link 150 such that the computing system 108 and the server system 160 are communicatively coupled to each other and such that the speech enhancement and audio event detection system 130 can receive audio input and provide the functions described herein.

Figure 1B:
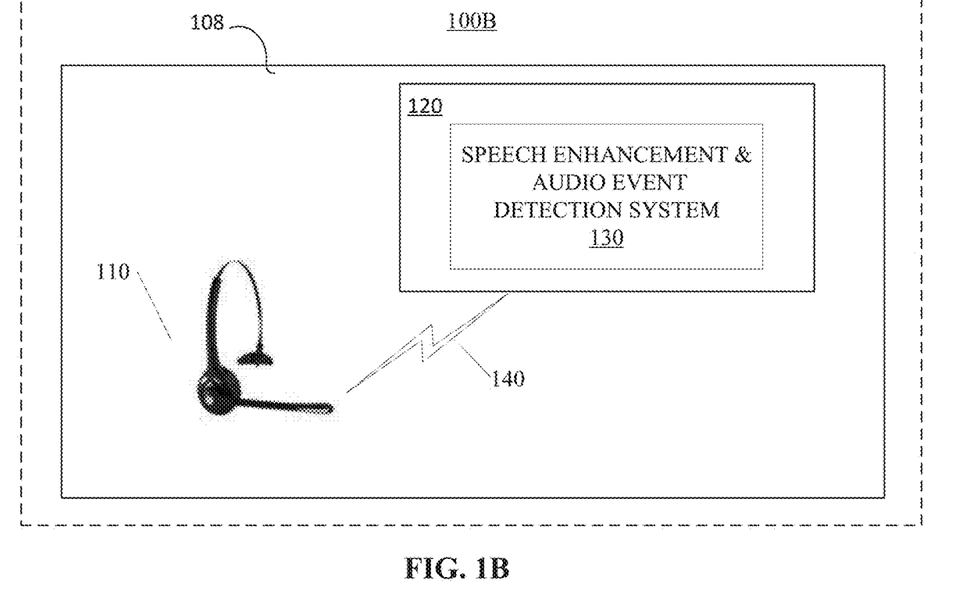
FIG. 1B is an illustration of an exemplary speech enhancement and audio event detection system according to another example embodiment of the described disclosure.

In an example embodiment, the computing system 108 may be a personal computer or desktop computer, a laptop, a cellular or smart phone, a tablet, a personal digital assistant (PDA), a gaming console, an audio device, a video device, a diagnostic device, an entertainment device such as a television, a vehicle infotainment, a wearable device, a thin client system, a thick client system, or the like. In some embodiments, the computing system 108 is a single client machine or a single group of client machines. In an example embodiment, as illustrated in FIG. 1A, the computing system 108 includes a computing device 120, e.g. a portable device such as a smart phone communicatively coupled to an audio device such as a headset 110. The headset 110 includes at least an acoustic sensor such as a microphone, a speaker, or any combination thereof. In another embodiment, the audio device 110 may communicatively couple directly to the communication network 146 or the server system 160. In this regard, the headsets 110 are not limited to those that are shown in FIGS. 1A and 1B, but may include any suitable wired, wireless, or any combination thereof that include any suitable number of acoustic sensors. As an example, the audio device may be a hearing aid, a listening device, goggles, or glasses with an integrated audio device, a helmet with an integrated audio device, or any suitable audio devices. In an example embodiment, the microphone includes directional, unidirectional, or omni-directional properties. In an example embodiment, the headset 110 has noise cancelling capability. In an example embodiment, the headset 110 is configured to cover ears of a user and attenuate external noise. In FIG. 1A, the headset 110 includes acoustic earmuffs to block out external noise and protect the ears of a user. In FIG. 1B, the headset includes noise cancelling capability.

In an example embodiment, the computing device 120 is in communication with the headset 110 via at least one communication link 140, which is wired, wireless, or any combination thereof. In an example embodiment, the headset 110 is in communication with at least its corresponding computing device 120, server system 160, communication network 146, or any combination thereof via suitable communication links 140 and/or 150, which can include Bluetooth® technology, WiFi technology, or any communication technology. The communication links 140 and 150 may be wired, wireless, or any combination thereof. The wireless communication links 140 and 150 may include cellular protocol, data packet protocol, radio frequency protocol, satellite band, infrared channel, or any other protocol able to transmit data among computing system 108, the server system 160, and the communication network 146. The wired communication link may include any wired line link.

In an example embodiment, the computing system 108 includes the appropriate network and/or communications technology such that the computing device 120 is enabled to communicate with at least an audio device (e.g., the headset 110) and the speech enhancement and audio event detection system 130.

In an example embodiment, the speech enhancement and audio event detection system 130 is implemented via a computer system with at least one processor and at least one electronic storage device, as well as the appropriate network technology. For example, in FIG. 1A, the speech enhancement and audio event detection system 130 is implemented via the server system 160. In this regard, for example, the server system 160 includes at least one server computer and at least one electronic storage device, as well as the appropriate network technology to communicate with the computing device 120. In this case, since the speech enhancement and audio event detection system 130 is implemented via the server system 160, the system 100A includes at least one communication network 146.

In an example embodiment, the communication network 146 can include at least one computer network, at least one data network, at least one telecommunications network, any suitable network, or any combination thereof. Communication network 146 is not limited in its structure, configuration, and/or components as long as it is able to provide the necessary communications between the speech enhancement and audio event detection system 130 of the server system 160 and the computing system 108. The communication network 146 can comprise one or more sub-networks, and can be installed between any combination of the computing devices 108 and the server system 160. In some embodiments, the communication network 146 can be, for example, a local-area network (LAN), a metropolitan area network (MAN), a wide area network (WAN), a primary network comprising multiple sub-networks located between the computing devices 108 and the server system 160, a cloud network, or any combination thereof. Still further embodiments include the communication network 146 that can include any network types such as a point to point network, a broadcast network, a telecommunication network, a data communication network, a computer network, an ATM (Asynchronous Transfer Mode) network, a SONET (Synchronous Optical Network) network, a SDH (Synchronous Digital Hierarchy) network, a wireless network, a wireline network, and the like. Depending on the application, other networks may be used so that data exchanged between the computing system 108 and the server system 160. Network topology of the communication network 146 can differ within different embodiments which may include a bus network topology, a star network topology, a ring network topology, a repeater-based network topology, or a tiered-star network topology. Additional embodiments may include a network of mobile telephone networks that use a protocol to communicate among mobile devices, where the protocol can be for example AMPS, TDMA, CDMA, GSM, GPRS, UMTS, LIE or any other protocol able to transmit data among mobile devices.

FIG. 1B illustrates an alternative example embodiment of a system 100B that includes at least one computing system 108, at least one speech enhancement and audio event detection system 130, and at least one communication link 140. As aforementioned, the computing system 108 includes at least one processor and at least one electronic storage medium, as well as the appropriate network/communications technology such that communications may occur between the appropriate hardware/software components of the computing system 108 and the speech enhancement and audio event detection system 130.

As discussed above, the speech enhancement and audio event detection system 130 can be implemented by various types of computer hardware and computer software, as long as the speech enhancement and audio event detection system 130 is configured to provide at least a clean speech signal 340, text 350, audio event data 390, or any combination thereof. In addition, the speech enhancement and audio event detection system 130 is configured to operate in any target environment in which machine learning techniques have been employed and the necessary machine learning data has been extracted. In this regard, the target environment itself can vary. For example, the target environment can be a manufacturing facility, a research lab, a construction site, or any environment in which a suitable amount of training data, such as audio samples corresponding to that target environment, is available.

Figure 2:
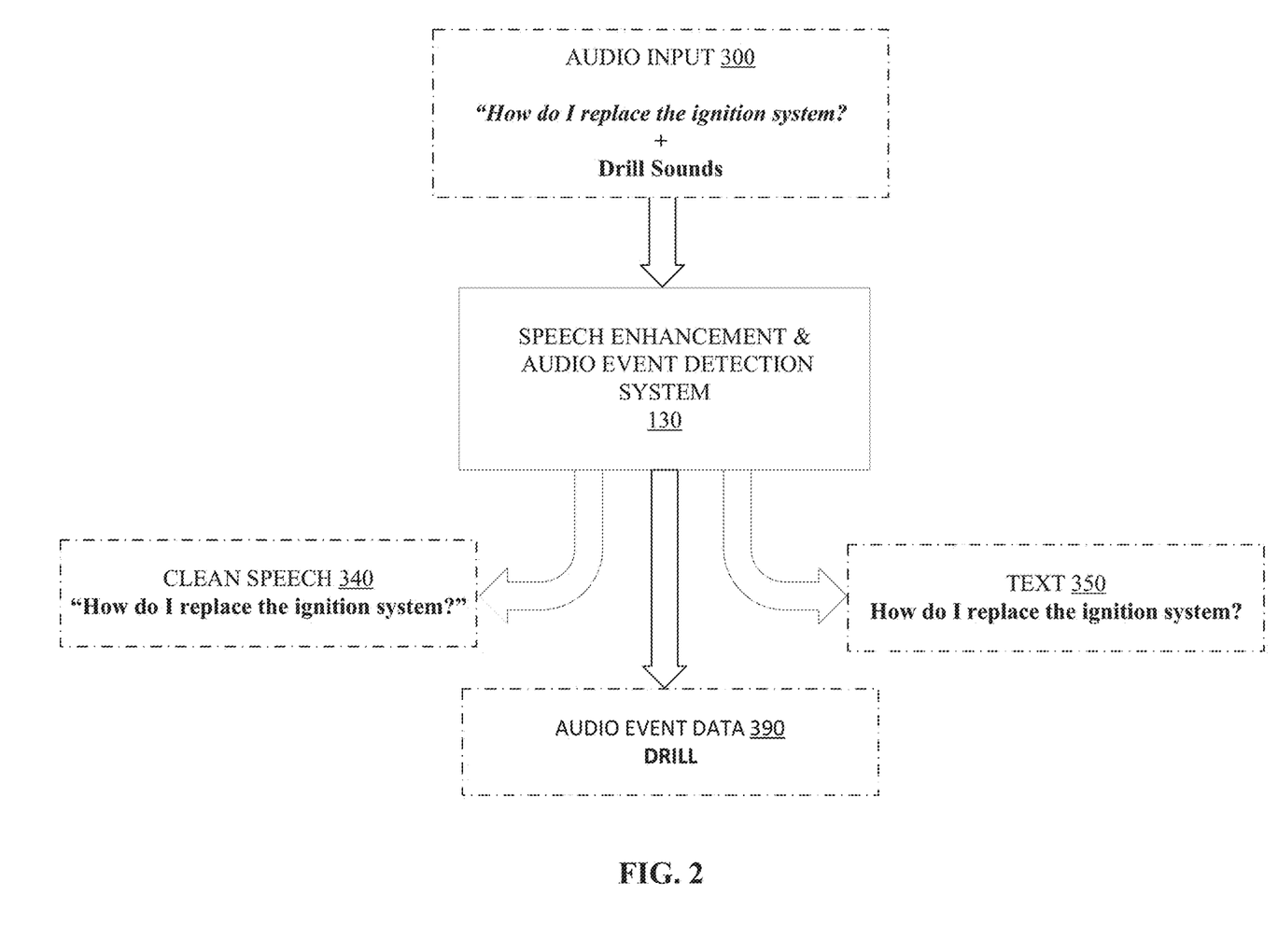
FIG. 2 is an illustration of a non-limiting example of an implementation of the speech enhancement and audio event detection system according to an example embodiment of the described disclosure.

FIG. 2 illustrates a non-limiting example of an implementation of the speech enhancement and audio event detection system 130 according to an example embodiment of the disclosure. In this particular example, the speech enhancement and audio event detection system 130 is configured to operate in an auto repair workshop environment. To be effective in this environment, the speech enhancement and audio event detection system 130 is configured to process the audio input 300 based on machine learning data (e.g., neural network model parameters) derived from audio samples, which are associated with an auto repair workshop environment.

In an example embodiment, the speech enhancement and audio event detection system 130 is configured to receive audio input 300. For example, in FIGS. 1A and 1B, the audio input 300 is transmitted to the speech enhancement and audio event detection system 130 via the headset 110. For instance, in this auto repair workshop example, a user has communicated his desire to receive auto-repair help via any suitable computer assistive technology, running on the computing device 120, by saying, "How do I replace the ignition system?" into the microphone of the headset 110.

Also, in this particular example, the audio input 300 includes some background noise from the auto-repair workshop. In this case, the background noise includes non-stationary noise such as a sound of a drill operating proximal to the user. That is, in this auto repair workshop example, the audio input 300, which is transmitted to the speech enhancement and audio event detection system 130, includes at least one speech component (e.g., "How do I replace the ignition system?") and at least one noise component (e.g., the sound of a drill).

In an example embodiment, the speech enhancement and audio event detection system 130 is configured to receive and process this audio input 300 in real-time. Also, in an example embodiment, the speech enhancement and audio event detection system 130 is configured to deliver clean speech 340 in real-time. For instance, in the auto repair workshop example, the user's voiced input of "How do I replace the ignition system?" is separated from the background noise (e.g., the sound of the drill) and delivered as clean speech 340 in real-time.

In an example embodiment, the speech enhancement and audio event detection system 130 is configured to provide at least the recognition and translation of the clean speech 340 into text 350. In the auto repair workshop example, the user's voiced input of "How do I replace the ignition system" is converted into the following text 350: "How do I replace the ignition system?" for display on computing system 108, any suitable device on the communication network 146, the server system 160, or any combination thereof.

Furthermore, in an example embodiment, the speech enhancement and audio event detection system 130 is configured to provide at least audio event data 390 relating to at least one identified noise component of the audio input 300. For example, in the auto repair workshop example, the speech enhancement and audio event detection system 130 is configured to detect the sound of the drill from the audio input 300 and provide an identification label of "DRILL."

Audio event data 390, such as the identification label of "DRILL," provides contextual information for the clean speech 340 ("How do I replace the ignition system") and/or the text 350. This contextual information provides a number of advantages. In this case, for example, upon being notified that a "DRILL" is being detected as an audio event in real-time, the computer-assistive technology is provided with contextual information, indicating that the drill is most likely in use even though the user has asked about replacing the ignition system. In this case, the computer-assistive technology is able to provide a message, such as "Please complete the drill operation started in the previous repair step before moving on to ignition replacement." In this regard, due to the contextual information provided by the audio event data 390, computer assistive technology, running on device 120, is able to provide safety notifications to the user. In addition, in such a case, the computer assistive technology is able to wait until the drill is no longer detected before providing the user with the repair steps on how to replace the ignition system. In this regard, by being provided with this audio event data 390, the computer assistive technology is able to ensure that the appropriate tools and steps are taken to perform the repair operation.

As another non-limiting example, the user could be in the middle of a repair and ask "what is the next step" into the headset 110. In this scenario, in addition to user's question, the speech enhancement and audio event detection system 130 detects the sound of a grinder tool as background noise and provides the audio event data 390 of "GRINDER." Meanwhile, the clean speech signal 340 is input to the ASR unit 220 and converted into text 350. In this example, the text 350 is processed by the Natural Language Understanding (NLU) engine, thereby enabling the computer assistive technology to understand that the user wants to know the next step of the repair operation. Given the contextual information that the grinder is still running, the computer assistive technology is configured to provide the following prompt: "Please stop the GRINDER and use an IMPACT WRENCH for the next repair step." In this regard, by receiving at least the text 350 together with the audio event data 390 from the speech enhancement and audio event detection system 130, the computer assistive technology is able to respond immediately to the user with the appropriate notifications.

Figure 3:
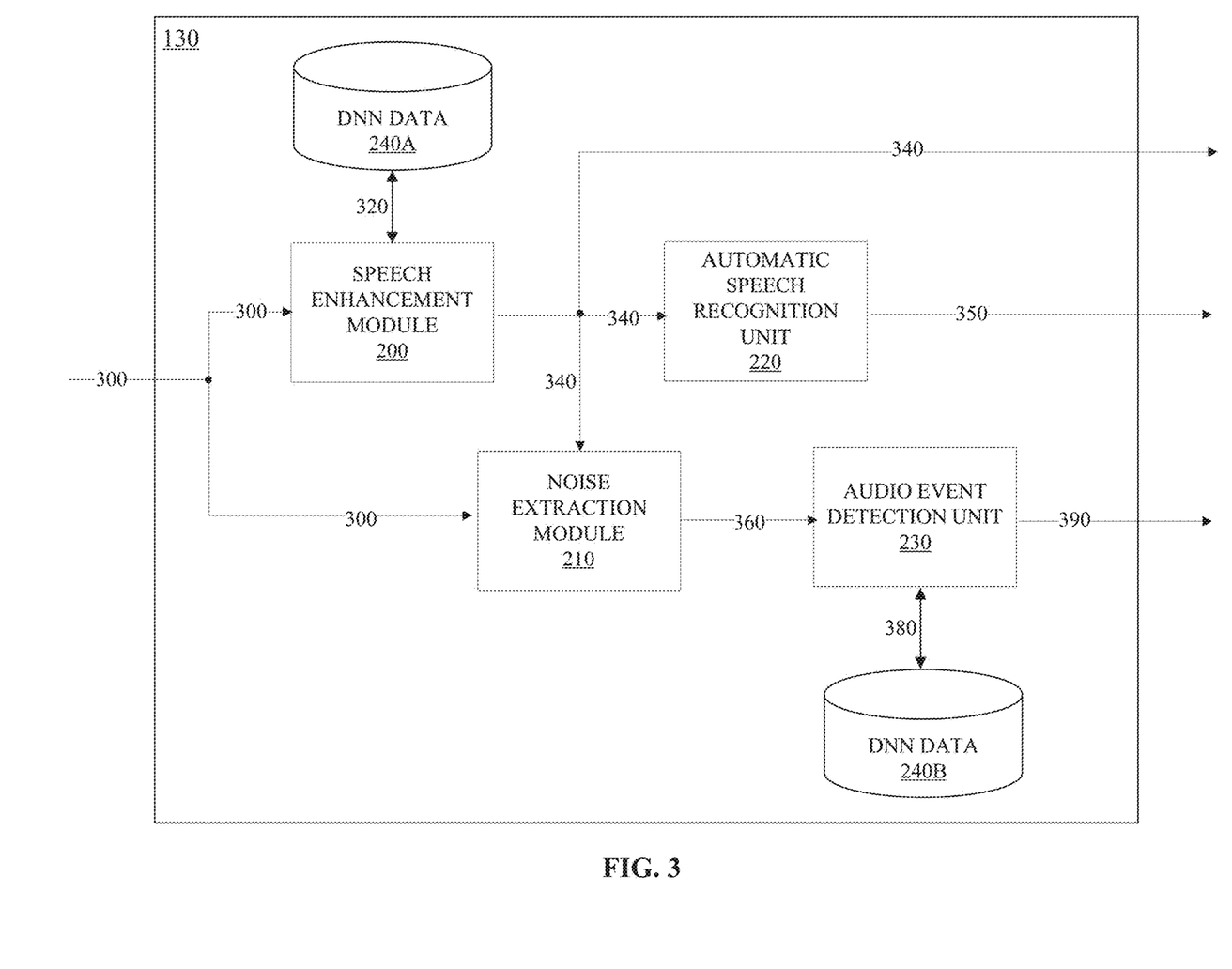
FIG. 3 is a schematic block diagram of the speech enhancement and audio event detection system according to an example embodiment of the described disclosure.
Figure 4:
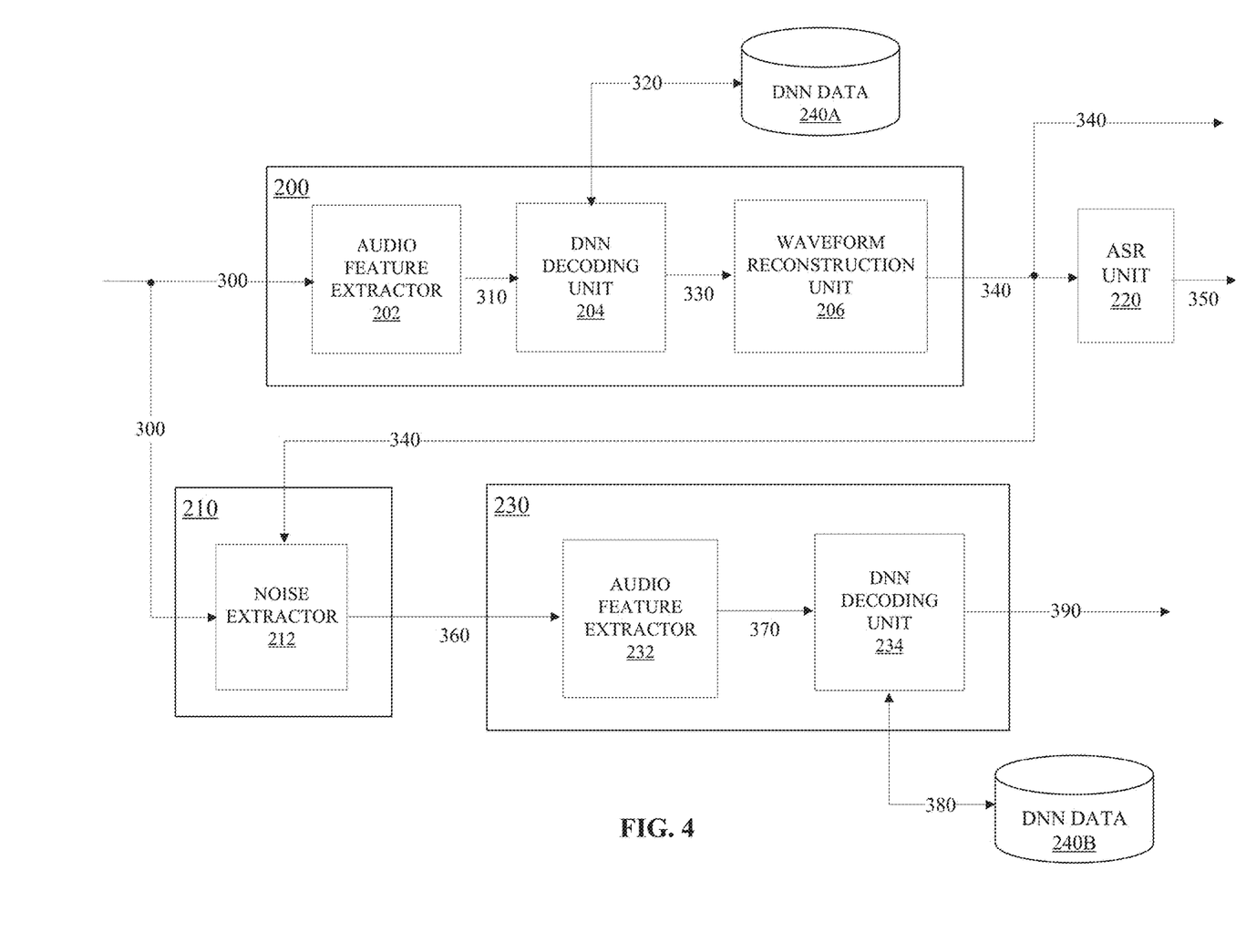
FIG. 4 is a schematic block diagram of the speech enhancement module, the noise determination module, and the audio event detection unit according to an example embodiment of the described disclosure.

FIGS. 3-4 are block diagrams of the speech enhancement and audio event detection system 130 according to an example embodiment. More specifically, FIG. 3 illustrates an overview of the speech enhancement and audio event detection system 130, whereas FIG. 4 illustrates certain features of the speech enhancement and audio event detection system 130 in greater detail. As shown, the speech enhancement and audio event detection system 130 is configured to receive audio input 300, which can be any type of audio signal. The speech enhancement and audio event detection system 130 is configured to process the audio input 300 and provide clean speech 340, text 350, audio event data 390, or any combination thereof. In an example embodiment, the speech enhancement and audio event detection system 130 includes a speech enhancement module 200, a noise extraction module 210, an automatic speech recognition (ASR) unit 220, an audio event detection (AED) unit 230, deep neural network (DNN) data 320, and DNN data 380. In an alternative embodiment, the ASR unit 220 is omitted from being a component within the speech enhancement and audio event detection system 130, but optionally connected to the speech enhancement and audio event detection system 130.

In an example embodiment, the speech enhancement module 200 is configured to receive audio input 300 and access DNN data 320 from at least one electronic storage device 240A. Based on the audio input 300 and the DNN data 320, the speech enhancement module 200 is configured to generate a clean speech estimate in real-time. The clean speech estimate is an audio signal in which noise of the audio input 300 is removed or reduced. In an example embodiment, the clean speech estimate is a clean speech signal 340.

In an example embodiment, to provide the clean speech signal 340, the speech enhancement module 200 includes at least an audio feature extractor 202, a DNN decoding unit 204, and a waveform reconstruction unit 206. In an example embodiment, the audio feature extractor 202 is configured to receive the audio input 300 in real-time. Upon receiving the audio input 300, the audio feature extractor 202 is configured to extract certain audio features 310 from the audio input 300. In this regard, for example, the audio features 310 can include log power spectrum (LPS) parameters, Mel-Frequency Cepstral Coefficients (MFCC), Linear Prediction Cepstral Coefficients (LPCC), Perceptual Linear Prediction (PLP) coefficients, other suitable acoustic/audio features, signal data, or any combination thereof. More specifically, the audio features, which are extracted by the audio feature extractor 202, are the same audio features that are extracted during a training phase (FIG. 5) to obtain the DNN data 320. For example, if LPS data was extracted during the training phase to obtain the DNN data 320, then the audio feature extractor 202 extracts LPS data from the audio input 300. Once extracted, the audio features 310 are transmitted to the DNN decoding unit 204.

In an example embodiment, the DNN decoding unit 204 is configured to receive the audio features 310 from the audio feature extractor 202. Upon receiving the audio features 310, the DNN decoding unit 204 is configured to decode the audio features 310 using DNN data 320, which is accessible from at least one electronic storage device 240A. More specifically, in an example embodiment, the DNN data 320 includes relationship information between various clean and noisy audio features. Based on this DNN data 320, the DNN decoding unit 204 is configured to obtain the clean audio features 330 from the audio features 310, which were extracted from the audio input 300. Next, the clean audio features 330 are transmitted from the DNN decoding unit 204 to the waveform reconstruction unit 206.

In an, example embodiment, the waveform reconstruction unit 206 is configured to perform waveform reconstruction based on the clean audio features 330 in real-time. More specifically, the waveform reconstruction unit 204 is configured to receive the clean audio features 330 from the DNN decoding unit 204 and generate a clean speech signal 340 (or a clean speech estimate 340) from the clean audio features 330. Afterwards, in an example embodiment, the clean speech signal 340 is transmitted from the waveform reconstruction unit 206 to the noise extraction module 210. Additionally or alternatively, in an example embodiment, the clean speech signal 340 is transmitted from the waveform reconstruction unit 206 to the ASR unit 220. Additionally or alternatively, in an example embodiment, the clean speech signal 340 is provided as output from the waveform reconstruction unit 206.

In an example embodiment, the ASR unit 220 includes speech recognition technology to provide speech recognition and translation services of the clean speech signal 340. For example, in the example shown in FIG. 3, the speech enhancement and audio event detection system 130 includes an ASR unit 220, which is configured to translate the clean speech signal 340 into text 350. The ASR unit 220 is configured to implement an algorithm that automatically converts speech signals into text 350. For example, the ASR unit 220 is configured to include and/or execute any suitable ASR software or commercially available software, such as that provided by Google, Nuance, AT&T, or any other entity. As another example, the ASR unit 220 is configured to include and/or execute any open source software toolkits, which are available to build ASR algorithms, such that provided by HTK, Kaldi, or any other entity.

In an example embodiment, the noise extraction module 210 includes a noise extractor 212, which is configured to extract a noise signal 360 (or a noise estimate 360) from the audio input 300. In addition, the noise extraction module 210 is configured to provide the extracted noise signal 360 to the AED unit 230. To do so, the noise extractor 212 is configured to receive both the audio input 300 and the clean speech signal 340. Upon receiving these inputs, the noise extractor 212 is configured to extract the non-speech portion, such as the noise signal 360, from the audio input 300 by removing the clean speech signal 340 from the audio input 300.

More specifically, in an example embodiment, the noise extractor 212 is configured to find the value of 'b' such that $E_t[(y(t)-b\ s'(t))^2]$ is minimized, where y(t) represents the audio input 300 taken at time "t", s'(t) represents the clean speech signal 340 taken at time "t," and $E_t$ is the expectation operator over time "t." In this regard, the noise extractor 212 is configured to obtain n'(t), which represents the noise signal 360, for example, via Equation 1.

$$n'(t)=y(t)-b\ s'(t) \quad \text{[Equation 1]}$$

In an example embodiment, the noise extractor 212 is configured to output the noise signal 360 (or the noise estimate 360) in real-time. In some instances, the noise estimate 360 includes background noise, such as a stationary noise, a non-stationary noise, or both stationary and non-stationary noises. Afterwards, the noise signal 360 is transmitted to the AED unit 230.

In an example embodiment, the AED unit 230 is configured to receive the noise estimate 360 from the noise extraction module 210. In addition, the AED unit 230 is configured to access DNN data 380 from at least one electronic storage device 240B upon receiving the noise estimate 360. Based on these inputs, AED unit 230 is configured to detect and recognize audio events. In addition, the AED unit 230 is configured to provide audio event data 390 based on this detection and recognition in real-time. For example, referring to FIG. 2, when the target environment is an auto repair workshop, the AED unit 230 is configured to provide identification labels that identify a tool, an auto-repair sound, or any noise, which is detected from the noise signal 360 (or the noise estimate 360) of the audio input 300. To do so, in an example embodiment, as shown in FIG. 4, the AED unit 230 includes an audio feature extractor 232 and a DNN decoding unit 234.

In an example embodiment, the audio feature extractor 232 is configured to receive the noise signal 360. Upon receiving the noise signal 360, the audio feature extractor 232 is configured to extract certain audio features 370 from the noise signal 360. In this regard, for example, the audio features 370 can include log power spectrum (LPS) parameters, Mel-Frequency Cepstral Coefficients (MFCC), Linear Prediction Cepstral Coefficients (LPCC), Perceptual Linear Prediction (PLP) coefficients, other acoustic/audio features, suitable signal data, or any combination thereof. More specifically, the audio features, which are extracted by the audio feature extractor 232, are the same audio features that are extracted during a training phase (FIG. 7) to obtain the DNN data 380. For example, if MFCC was extracted during the training phase to obtain DNN data 380, then the audio feature extractor 232 extracts MFCC from the noise signal 360. Once extracted, the audio features 370 are transmitted to the DNN decoding unit 234.

In an example embodiment, the DNN decoding unit 234 is configured to receive the audio features 370 from the audio feature extractor 232. Upon receiving the audio features 370, the DNN decoding unit 234 is configured to decode the audio features 370 of the noise signal 360 by using DNN data 380, which is accessible from at least one electronic storage device 240B. Based on the decoding, the DNN decoding unit 234 is configured to provide audio event data 390.

In an example embodiment, when performing the decoding operation, the DNN decoding unit 234 is configured to select the audio event data 390, which most likely corresponds to the extracted audio features. In this regard, for example, the DNN decoding unit 234 is configured to provide different audio labels and likelihood scores. For instance, with regard to the auto repair workshop scenario discussed above, a non-limiting example of some of the audio labels and likelihood scores, which are provided by the DNN decoding unit 234, are as follows: "DRILL": 1.5, "WRENCH": −0.5, "HAMMER": −1.2, and etc. As demonstrated by this example, the values of the likelihood scores can range anywhere from negative values to positive values. In addition, the likelihood scores are obtained for all audio event data 390 (e.g., all of the audio labels of FIG. 7). Accordingly, in this example embodiment, the audio label with the highest likelihood score or the maximum likelihood score is determined to most likely be the corresponding audio event for the audio features 370. For instance, in the above example, the audio label of "DRILL" is determined to have the highest likelihood score of 1.5 and is therefore selected by the DNN decoding unit 234 to be the audio event data 390. That is, in this scenario, the DNN decoding unit 234 outputs "DRILL" as the audio event data 390.

In an example embodiment, the likelihood score is calculated from DNN output values in the following manner. First, the DNN output values, denoted by $y_i$, where i=1, 2 ... N (corresponding to the "N" number of audio labels), are passed to a softmax function to calculate corresponding $z_i$ values, for example, via Equation 2.

$$z_i = \frac{e^{y_i}}{\sum_{k}^{N} e^{y_k}} \quad \text{[Equation 2]}$$

In an example embodiment, the softmax function converts the DNN output, i.e., $\underline{y}_i$ values, to a set of $z_i$ values so that each of them are between 0 to 1, and so they add up to 1, i.e., $z_1+z_2 \ldots z_N=1$. Next, for each of these $z_i$ values, the likelihood score $L_i$ is calculated, for example, via Equation 3.

$$L_i = \log\left(\frac{z_i}{\sum_{j=1, j \neq i}^{N} z_j}\right) \quad \text{[Equation 3]}$$

As an example, suppose the DNN output includes at least the following three values: $y_1$, $y_2$ and $y_3$. These values correspond to the audio labels of "DRILL", "WRENCH" and "HAMMER", respectively. If $y_1$=0.9, $y_2$=0.2, and $y_3$=0.1, then after the softmax operation, the DNN decoding unit 234 is configured to determine that $z_1$=0.52, $z_2$=0.25, and $z_3$=0.23. In this case, the DNN decoding unit 234 determines that the likelihood scores are $L_1$=0.03, $L_2$=−0.47, $L_3$=−0.52.

Figure 7:
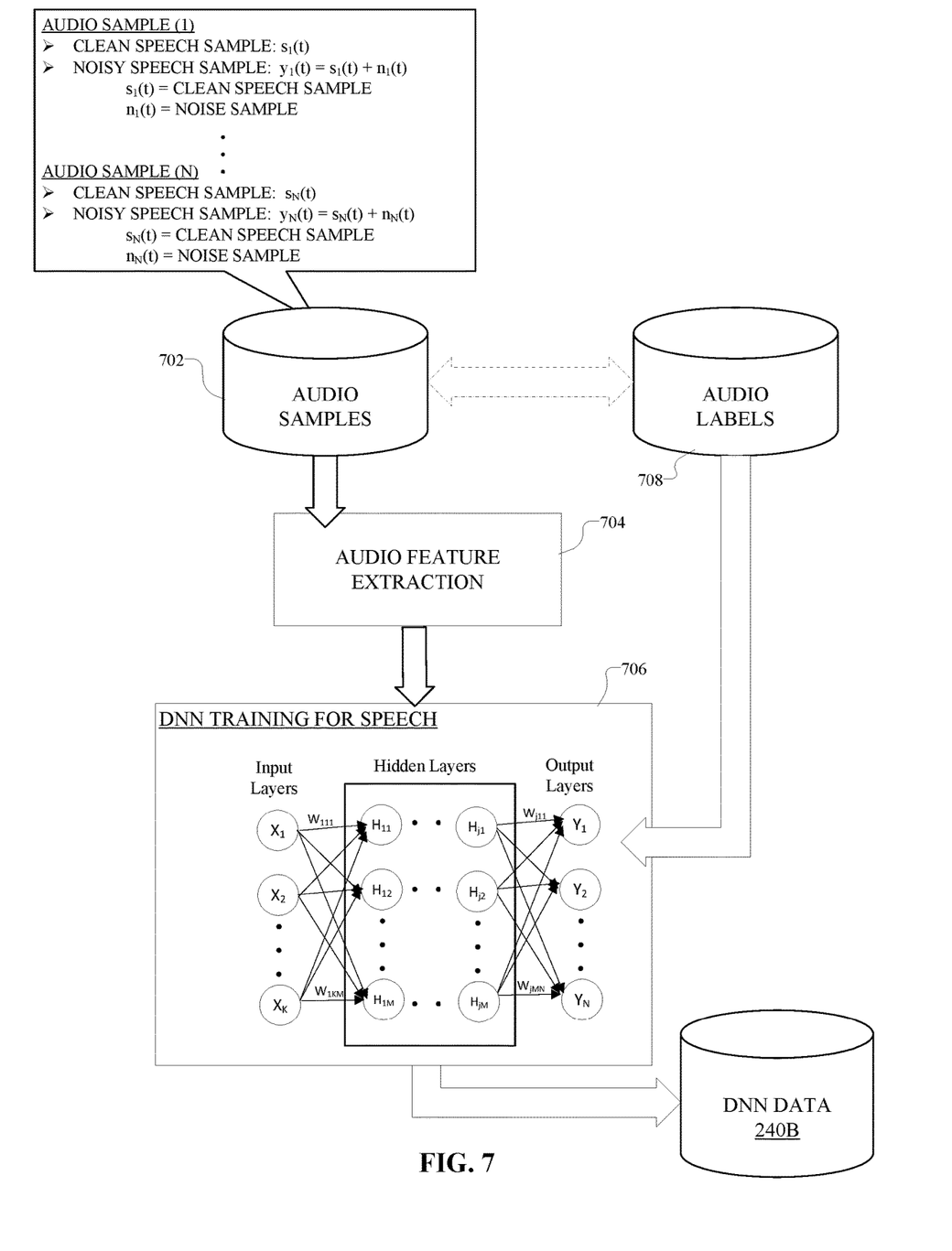
FIG. 7 is a flow diagram of a training phase for audio event detection according to an example embodiment of the described disclosure.

In this example embodiment, the DNN decoding unit 234 does not provide a "likelihood score" for a noise signal (or audio event), which it does not observe during the training phase (FIG. 7). In this regard, for example, if all of the likelihood scores are below a certain value or a predetermined threshold (e.g., zero), then the AED unit 230 is configured to determine that none of the audio events (e.g., audio labels) are likely to correspond to the noise signal 360. In this scenario, the AED unit 230 considers the audio event data 390 to be NULL. Also, in an example embodiment, when a noise occurs which does not correspond to any audio events that were used during the training phase (FIG. 7), the DNN decoding unit 234 is configured to provide a low likelihood score for all of the existing labels below zero, as described earlier. In this case, the DNN decoding unit 234 decides that none of the audio events are "likely enough" and sets the output of the audio event data 390 to be NULL.

Additionally or alternatively, in an example embodiment, the DNN decoding unit 234 is configured to consider high likelihood scores from two different audio labels (e.g., a likelihood score of 1.5 for "DRILL" and a likelihood score of 1.4 for "HAMMER") and decide that both of the audio events have occurred. In some cases, although a second audio label is detected from the audio input 300 and determined to be a likely audio event, this second audio label (e.g., "HAMMER"), which is detected, may not impact the current repair scenario and may not change the systems prompts provided by computer assistive technology of the computing device 120. The DNN decoding unit 234 is configured to perform DNN decoding and provide likelihood scores for each of the audio events (e.g., audio labels) in real-time.

As discussed above, DNN data 320 is accessed during the process of providing the clean speech signal 340, whereas DNN data 380 is accessed during the process of providing audio event data 390. Also, as discussed, DNN data 320 and DNN data 380 are stored in at least one electronic storage device 240. In an example embodiment, the reference labels 240A and 240B may refer to different portions of the same electronic storage device. In an alternative example embodiment, each of the reference labels 240A and 240B refers to at least one electronic storage device such that the reference labels 240A and 240B comprise a plurality of electronic storage devices. Furthermore, irrespective of their electronic configurations and storage arrangements, DNN data 320 and DNN data 380 are provided to at least one electronic storage device after being obtained during training phases (FIGS. 5 and 7).

In an example embodiment, the training phases occur when the computer system, which is implementing the speech enhancement and audio event detection system 130, is offline. In this regard, for example, the training phases may occur when the server system 160 or the computing device 120 is offline. A detailed description of the training phases is discussed below.

Figure 5:
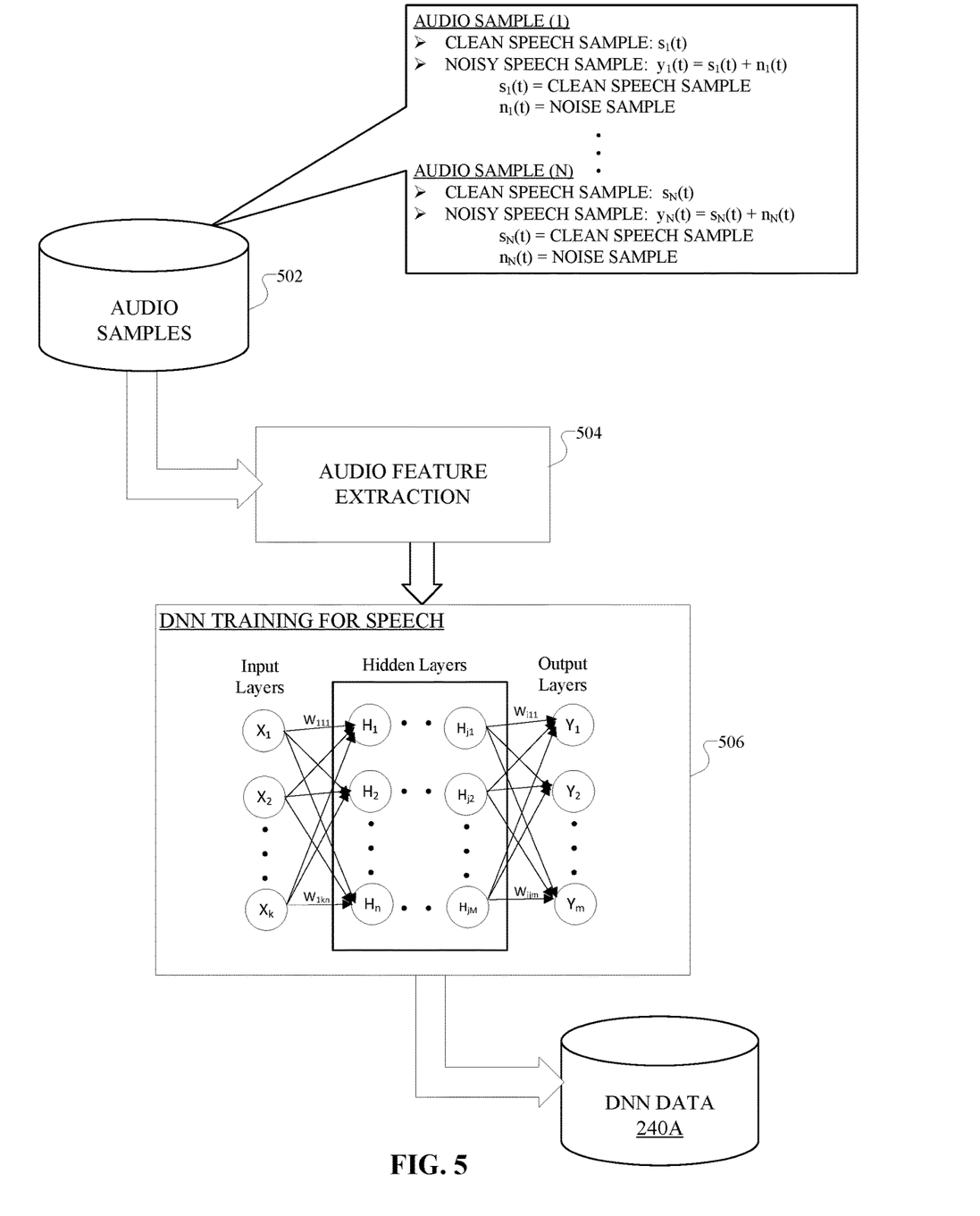
FIG. 5 is a flow diagram of a training phase for speech enhancement according to an example embodiment of the described disclosure.

FIG. 5 is a flow diagram of a training phase for speech enhancement according to an example embodiment. The training phase includes performing audio feature extraction 504 by extracting audio features from audio samples 502. In order to be effective, the DNN training module is trained with a large number of audio samples 502 associated with a target environment. As shown, the DNN training module may be trained with 'N' number of audio samples 502, where 'N' represents a suitable number of samples. For example, in an example embodiment, 'N' represents an integer number that is equal to or greater than 10,000 audio files (with a total duration of 500 hours). In general, the speech enhancement module 200 is configured to perform better when utilizing DNN data 320, which is obtained by training a DNN model with a greater number of samples.

In an example embodiment, each audio sample includes a clean speech sample and a noisy speech sample. Each noisy speech sample is obtained by adding a noise sample to a clean speech sample. More specifically, the noisy speech sample may be represented by Equation 4.

$$y(t)=s(t)+n(t) \quad \text{[Equation 4]}$$

In this equation, y(t) represents the noisy speech sample taken at time t, s(t) represents the clean speech sample taken at time t, and n(t) represents the noise sample taken at time t. As indicated, with respect to time t, the noisy speech sample equates to a sum of a clean speech sample and a noise sample. In this regard, various combinations of clean speech samples, noise samples, and noisy speech samples are generated for use as audio samples 502.

For instance, in the auto repair workshop example, the audio samples 502 may include noisy speech samples in which the noise samples are typical sounds of an auto repair workshop. In this regard, for example, the noise samples include audio recordings of non-stationary noises, stationary noises, or any combination thereof. As examples, the noise samples may include audio recordings of a drill, a cutter, a welding system, other auto repair workshop sounds, or any combination thereof. In this regard, the DNN training module is configured to employ machine learning techniques to learn a variety of noises of the auto-repair workshop and to generate DNN data 320 based thereupon.

In an example embodiment, the DNN training module includes a DNN model with multiple layers. For example, the DNN model includes an input layer, hidden layers, and an output layer. As shown in FIG. 5, the input layer includes a plurality of input nodes (e.g., $X_1$ to $X_k$, where 'k' represents the number of nodes) and the output layer includes a plurality of output nodes (e.g., $Y_1$ to $Y_m$, where 'm' represents the number of nodes). In addition, each of the hidden layers includes a plurality of nodes (e.g., $H_1$ to $H_n$, where 'n' represents the number of nodes). More specifically, in an example embodiment, the DNN model includes an input feature dimension of 350 in which the input feature dimension is equal to the number of input nodes. Alternatively, in a case in which a sequence of feature vectors are passed to the DNN, the feature vector dimension and the number of DNN input nodes can be different. Meanwhile, in this example, the DNN model includes 3 hidden layers in which each hidden layer includes 2500 nodes. Also, in this example, the DNN model includes 350 output nodes.

In an alternative example embodiment, the DNN model includes an input layer with multiple audio features as input. For example, if an audio feature, which is represented by a vector, contains "D" number of parameters and if "N" number of consecutive audio features (coming from the audio samples 502 in real-time) are input into the DNN model at the same time, then the input layer includes D×N nodes, i.e. the input layer includes a number of nodes that is equal to D multiplied by N.

In an example embodiment, each node of the DNN model takes a scalar number as input in the input layer. Each scalar number is transmitted to corresponding nodes in a hidden layer with different weight parameters "W." For each node in each layer, the weight parameters "W" are unique. Each node in a hidden layer accepts the corresponding output values from the previous layer and adds them to form one scalar parameter. This parameter is then processed through a sigmoid function S(t), as set forth, for example, in Equation 5.

$$S(t) = \frac{1}{1+e^{-t}} \quad \text{[Equation 5]}$$

The corresponding result from the sigmoid function is then passed to the next layer of nodes. The process of DNN training generally involves learning the weight parameters "W" such that when a noisy audio feature is provided as input, then the output closely approximates a clean version of that audio feature.

In an example embodiment, the DNN training module includes a stack of restricted Boltzmann machines (RBMs) to initialize the DNN model. The structure of the RBM layers are the same or substantially similar to the DNN layers except that it follows an unsupervised training mechanism. The RBMs provide pre-training for the DNN training. In this regard, the RBMs are a mathematical tool, which is implemented in software and used to train the DNN model.

In an example embodiment, the DNN training module includes a DNN model with an input layer associated with the noisy speech samples and an output layer associated with the clean speech samples. In this regard, for instance, the input layer receives the noisy audio features ($X_{noisy}$) and the desired output is the corresponding clean audio features ($Y_{output}$). To achieve this, the RBM pre-training, as discussed above, is performed. Next, for each noisy audio feature frame that is input, the output is calculated as $Y_{output}$. This $Y_{output}$ is then compared with the corresponding clean feature frame and an error is generated, as indicated, for example, by Equation 6.

$$\text{Error}=E[(X_{clean}-Y_{output})^2] \quad \text{[Equation 6]}$$

Equation 6 is a mean squared error function between the audio features of the output layer ($Y_{output}$) and desired clean features ($X_{clean}$). As indicated above, the error, calculated for this equation, is lower when the clean audio features are more similar to the audio features of the output. This error is then used with the back-propagation method, which finds the responsibility of each of the "W" parameters in the DNN model for this error and modifies them so that the error is reduced. In an example embodiment, these operations are iterated many times (e.g., at least 100 times).

In an example embodiment, DNN training module is configured to implement various machine learning techniques (e.g., regression based machine learning techniques), functions, operations, and equations such that its DNN model learns how to obtain the audio features of clean speech given the audio features of the noisy speech. The DNN training module is configured to store its DNN model parameters as DNN data 320 in at least one electronic storage device 240A. In an example embodiment, the DNN data 320 includes at least the weight parameters "W" (FIG. 5), which are obtained through the iterative training process of the DNN model, as discussed above and shown at 506.

Figure 6:
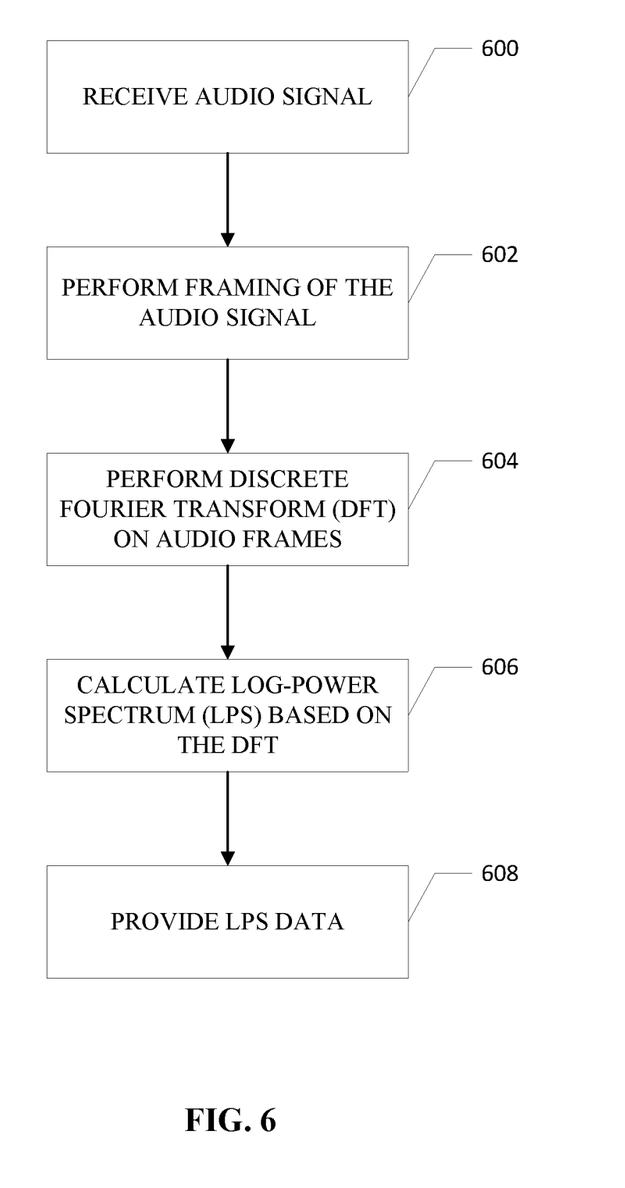
FIG. 6 is a flowchart of a method for extracting audio features according to an example embodiment of the described disclosure.

FIG. 6 is a flowchart of a method for extracting audio features according to an example embodiment. This extraction process is configured to be implemented as (i) the audio feature extraction process performed by the audio feature extractor 202, (ii) the audio feature extraction process performed by the audio feature extractor 232, (iii) the audio feature extraction process performed in FIG. 5, (iv) the audio feature extraction process performed in FIG. 7, or (v) any combination thereof. To illustrate, in an example embodiment, this extraction process is performed at least during the training phase in which audio features are extracted in FIG. 5, as well as during normal operation when the audio features are extracted by the audio feature extractor 202.

As shown, the method includes extracting audio features from an input such as an audio signal at 600. For example, when this method is applied during the training phase, the input may refer to each of the audio samples, as shown in FIG. 5. In this regard, the method of extracting audio features is applied to the clean speech samples and the noisy speech samples. As another example, when this method is applied by the audio feature extractor 202, as shown in FIG. 4, the input may refer to audio input 300.

Once the input is received, the method includes framing the input as indicated at 602, to provide audio frames. The audio frames may be a suitable length. For example, the audio frames may be 25 milliseconds in duration. At 604, the method includes performing a discrete Fourier transform (DFT) on the audio frames. At 606, the method includes calculating LPS data based on the DFT. More specifically, the LPS data includes LPS coefficients, which are calculated from DFT coefficients by taking the magnitude squared and by taking the logarithm of the values. Once the calculations have been performed, the method includes providing the LPS data as output, as indicated at 608.

FIG. 7 is a flow diagram of a training phase for audio event detection according to an example embodiment. The training phase includes performing audio feature extraction 704 by extracting audio features from audio samples 702. As shown, the DNN training module may be trained with 'N' number of audio samples 702, where 'N' represents a suitable number of samples. For example, in an example embodiment, 'N' represents an integer number that is equal to or greater than 10,000 audio files (with a total duration of 500 hours). In this regard, for example, the N audio samples 702 are the same as the audio samples 502, which were discussed with respect to FIG. 5. In general, the AED unit 230 is configured to perform better when utilizing DNN data 380, which is obtained by training a DNN model with a greater number of samples.

Once extracted, the audio features are transmitted to the DNN training module. Additionally, as shown, the DNN training module is configured to receive audio event data 390, such as audio labels 708, which relate to the audio samples 702 and possible audio events of the target environment. In an example embodiment, the audio labels 708 include identification labels, audio descriptions, other relevant information, or a combination thereof.

For instance, in the auto repair workshop example, the audio labels 708 may include the names of the auto repair tools, the auto repair sounds, sources of noise, or any suitable audio information. In this regard, for instance, one of the audio samples 702 may include a noisy speech sample, which includes speech together with a hammering sound. In this case, the audio labels 708 include an audio label of "HAMMER" to correspond to the hammering sound.

In an example embodiment, the DNN training module includes a DNN model with multiple layers. For example, the DNN model includes an input layer, hidden layers, and an output layer. As shown in FIG. 5, the input layer includes a plurality of input nodes (e.g., $X_1$ to $X_K$, where 'K' represents the number of nodes) and the output layer includes a plurality of output nodes (e.g., $Y_1$ to $Y_N$, where 'N' represents the number of nodes). In addition, each of the hidden layers includes a plurality of nodes (e.g., $H_1$ to $H_M$, where 'M' represents the number of nodes). More specifically, in an example embodiment, the DNN model for speech includes an input feature dimension for MFCC of 60 in which the number of input nodes is equal to the input feature dimension that is fed into the DNN model. In this case, the DNN model includes 2 hidden layers in which each hidden layer includes 100 nodes. In addition, in this example, the DNN model includes a number of nodes, which corresponds to the number of audio events, which are to be detected for the target environment. As an example, a target environment with 50 audio events (or audio labels) includes 50 nodes in its output layer.

As shown in FIG. 7 and discussed above, the DNN training module is configured to implement supervised machine learning techniques, such as regression based DNN, so that its DNN model learns how to identify different audio events and provide the appropriate audio labels 708 based on the extracted audio features. The DNN training module is configured to store its DNN model parameters as DNN data 380 in at least one electronic storage device 240B. In an example embodiment, the DNN data 380 includes at least the weight parameters "W" (FIG. 7), which are obtained through the iterative training process of the DNN model, as discussed above and shown at 706.

In an example embodiment, each weight parameter W is a value, which assigns the multiplying factor between two nodes. For example, in FIG. 7, the connection arrow between node $X_1$ and node $H_{11}$ has a weight of $W_{111}$. In this regard, for example, the output from node $X_1$ will be multiplied by $W_{111}$ before entering node $H_{11}$. In the example shown in FIG. 7, the set of W parameters includes three indices: j=the layer number, K=the node number from the source node, and M=the node number at the destination layer. Thus, for example, the output from node $X_5$ that goes into node $H_{12}$ will have a weight parameter $W_{152}$, since, here: i=1 (since it's the input, or first layer), K=5, and M=2.

Figure 8:
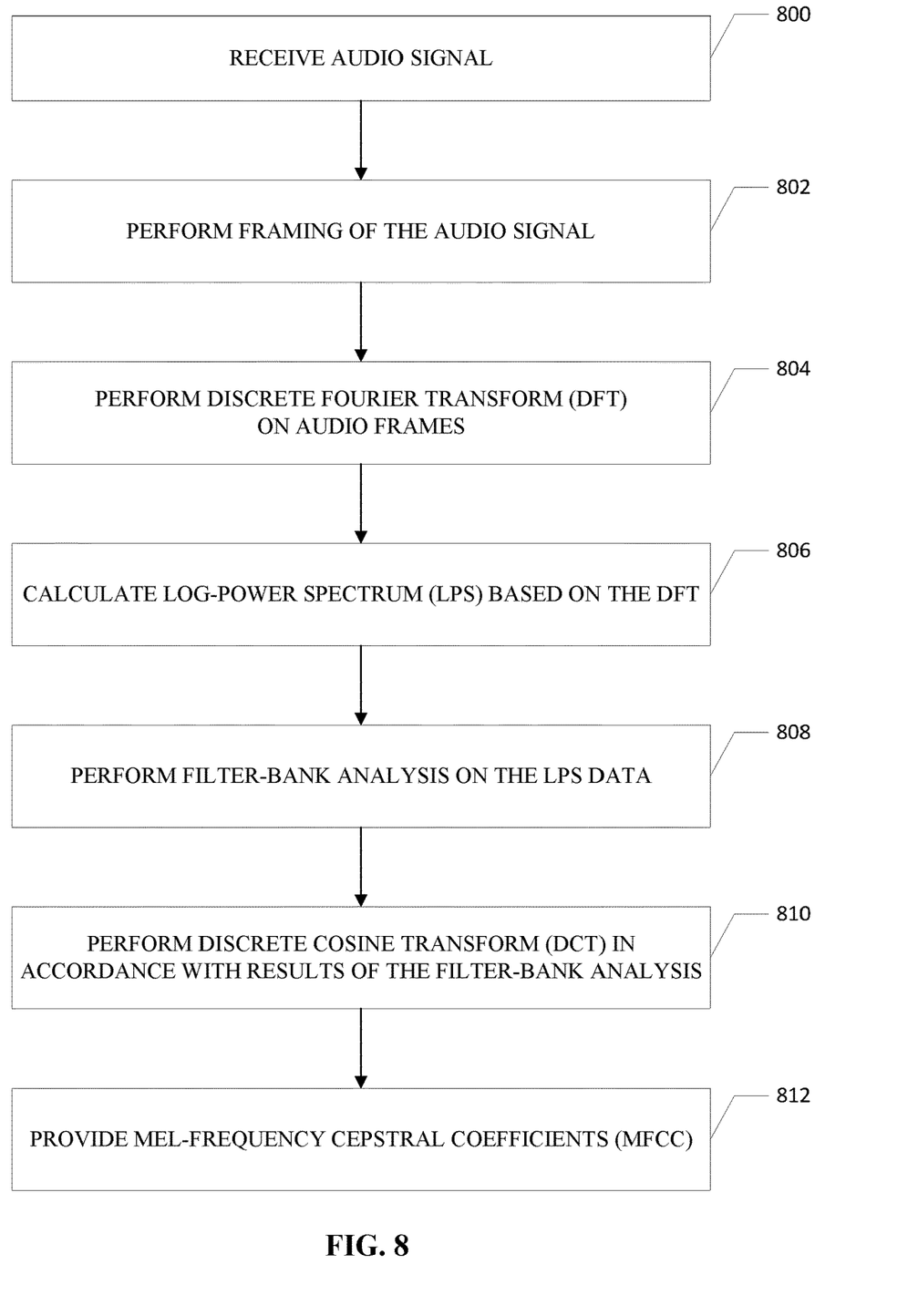
FIG. 8 is a flowchart of a method for extracting audio features according to an example embodiment of the described disclosure.

FIG. 8 is a flowchart of a method for extracting audio features according to an example embodiment. This extraction process is configured to be implemented as (i) the audio feature extraction process performed by the audio feature extractor 202, (ii) the audio feature extraction process performed by the audio feature extractor 232, (iii) the audio feature extraction process performed in FIG. 5, (iv) the audio feature extraction process performed in FIG. 7, or any combination thereof. For example, in an example embodiment, this method may be implemented at least during the training phase in which audio features are extracted in FIG. 7, as well as during normal operation when audio features are extracted by the audio feature extractor 232.

As shown, the method includes receiving input such as an audio signal at 800. For example, when this method is applied during the training phase, the input may refer to the audio samples, as shown in FIG. 7. As another example, when this method is applied by the audio feature extractor 232, as shown in FIG. 4, the input may refer to noise signal 360 (or noise estimate 360).

Once the input is received, the method includes framing the input, as indicated at 802, to provide audio frames. The audio frames may be any suitable length. In one example, the audio frames may be 25 milliseconds in duration. At 804, the method includes performing DFT on the audio frames. At 806, the method includes calculating LPS data based on the DFT. More specifically, the LPS data includes LPS coefficients, which are calculated from DFT coefficients by taking the magnitude squared and by taking the logarithm of the values. Once the calculations have been performed, the method includes performing a filter bank analysis on the LPS data, as indicated at 808. Next, at 810, the method includes performing a discrete cosine transform (DCT) in accordance with results of the filter-bank analysis. Once the DCT has been performed, the method includes providing MFCC data as output, as indicated at 812.

As discussed above, the speech enhancement and audio event detection system 130 provides a number of advantages. For example, the speech enhancement and audio event detection system 130 is configured to provide clean speech 340 and/or text 350 from the audio input 300 even if background noise is present. In addition, by providing the speech enhancement and audio event detection system 130 with the ability to remove the clean speech from the audio input 300, the AED unit 230 is able to perform better by directly receiving a noise signal 360 instead of audio input 300.

In addition, the speech enhancement and audio event detection system 130 is configured to provide contextual information, such as audio event data 390. In effect, this contextual information benefits the user and any other system that is in communication with the speech enhancement and audio event detection system 130 by enabling computer assistive technology to provide intelligent, immediate, and customized services to the user based on the user's utterances and the context thereof. For instance, in the aforementioned auto repair workshop example, if a user is using the wrong tool while relying on computer assistive technology to perform a repair, then the computer assistive technology can immediately warn the user that the wrong tool is being used by recognizing the audio event (e.g., the sound of the wrong tool) from the background noise and relaying that information to the computer assistive technology and the user. As another example, upon detecting that the user is using a tool for a period that is longer than that which is recommended (or that an audio event is detected at an inappropriate time), the computer assistive technology can provide an appropriate message to the user. Also, as another example, if the audio event, which is detected, is determined to be too loud, then the computer assistive technology can prompt the user, for instance, to wear earplugs. As demonstrated by these illustrative examples and as discussed above, the speech enhancement and audio event detection system 130 provides a number of advantageous features.

Furthermore, as aforementioned, the AED unit 230 itself advantageously provides contextual information in the form of audio event data 390. Moreover, the advantages of the AED unit 230 can be obtained without being a part of the speech enhancement and audio event detection system 130. For example, in an alternative embodiment, the AED unit 230 is a standalone unit with access to the DNN data 380 stored in at one electronic storage device 240B. In this alternative embodiment, the AED unit 230 is configured to provide audio event data 390 by decoding audio features of its input based on the DNN data 380. That is, in this alternative embodiment, the AED unit 230 is configured to provide audio event data 390 without the additional processing of the speech enhancement module 200 and the noise extraction module 210. This is particularly advantageous in instances in which speech enhancement and speech recognition are not necessary, but fast processing of noise data and fast obtainment of audio event data are desirable. In addition, the AED unit 230, as a standalone unit, requires less hardware and/or software than that of the example embodiment shown in FIGS. 3-4.

That is, the above description is intended to be illustrative, and not restrictive, and is provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not be limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method comprising:
    obtaining by at least one computer processor, audio input;
    extracting, by the at least one computer processor, audio features of the audio input;
    generating, by the at least one computer processor, clean audio features for clean speech via a first machine learning system based on the audio features of the audio input;
    generating, by the at least one computer processor, a clean speech signal based on the clean audio features of the audio input such that the clean speech signal is an audio signal in which noise of the audio input is removed or reduced;
    extracting, by the at least one computer processor, a noise signal from the audio input by using the clean speech signal to obtain the noise signal from the audio input after the clean speech signal is generated from the clean audio features;
    extracting, by the at least one computer processor, audio features of the extracted noise signal that is a result obtained after the clean speech signal is removed from the audio input;
    generating, by the at least one computer processor, an audio label via a second machine learning system that receives the audio features of the extracted noise signal as input and selects the audio label that identifies a noise source that is determined to correspond to the audio features of the extracted noise signal based on a likelihood score; and
    transmitting, by the at least one computer processor, the audio label to computer assistive technology that provides a response to the clean speech signal while using the audio label as contextual information.

2. The computer-implemented method of claim 1, wherein the second machine learning system includes a neural network model that is trained with (i) audio samples associated with a target environment, and (ii) audio labels associated with the audio samples.

3. The computer implemented method of claim 1, further comprising:
    decoding, by the at least one computer processor, the audio features of the audio input via the first machine learning system to generate the clean audio features.

4. The computer-implemented method of claim 3, wherein the the first machine learning system includes a trained neural network model that is trained with audio samples associated with a target environment.

5. The computer-implemented method of claim 1, further comprising:
recognizing and translating, by the at least one computer, processor, the clean speech signal into text.

6. The computer-implemented method of claim 1, wherein:
the computer-assistive technology assists with a process of repairing a machine; and
the audio label identifies a power tool as the noise source.

7. The computer-implemented method of claim 1, wherein the step of extracting the audio features of the extracted noise signal further comprises:
generating an audio frame of the extracted noise signal;
performing a discrete transform with respect to the audio frame;
generating log power spectrum data of the discrete transform; and
inputting the log power spectrum data to the second machine learning system as the audio features of the extracted noise signal.

8. The computer-implemented method of claim 1, wherein:
the first machine learning system includes at least a first deep neural network; and
the second machine learning system includes at least a second deep neural network.

9. The computer-implemented method of claim 1, wherein the step of extracting the noise signal from the audio input further includes:
determining a value of 'b' such that $E_t[(y(t)-bs'(t))^2]$ is minimized,
where,
t represents time,
y(t) represents the audio input with respect to the time,
s'(t) represents the clean speech signal with respect to the time, and
$E_t$ is an expectation operator with respect to the time; and
obtaining the noise signal via n'(t)=y(t)−bs'(t),
where n'(t) represents the noise signal.

10. A computer system comprising:
at least one computer processor configured to:
(a) obtain audio input,
(b) extract audio features of the audio input,
(c) generate clean audio features for clean speech via a first machine learning system based on the audio features of the audio input,
(d) generate a clean speech signal based on the clean audio features of the audio input such that the clean speech signal is an audio signal in which noise of the audio input is removed or reduced,
(e) extract a noise signal from the audio input by using the clean speech signal to obtain the noise signal from the audio input after the clean speech signal is generated from the clean audio features,
(f) extract audio features of the extracted noise signal that is a result obtained after the clean speech signal is removed from the audio input,
(g) generate an audio label via a second machine learning system that receives the audio features of the extracted noise signal as input and selects the audio label that identifies a noise source that is determined to correspond to the audio features of the extracted noise signal based on a likelihood score; and
(h) transmit the audio label to computer assistive technology that provides a response to the clean speech signal while using the audio label as contextual information.

11. The computer system of claim 10, wherein the second machine learning system includes a neural network model that is trained with (i) audio samples associated with a target environment, and (ii) audio labels associated with the audio samples.

12. The computer system of claim 10, wherein
the at least one computer processor is configured to generate the clean speech signal by employing the first machine learning system to decode the audio features of the audio input into the clean audio features.

13. The computer system of claim 12, wherein the the first machine learning system includes a trained neural network model that is trained with audio samples associated with a target environment.

14. The computer system of claim 10, wherein the at least one computer processor is further configured to recognize and translate the clean speech signal into text.

15. The computer system of claim 10, wherein:
the computer-assistive technology assists with a process of repairing a machine; and
the audio label identifies a power tool as the noise source.

16. The computer system of claim 10 wherein the at least one computer processor is further configured to:
generate an audio frame of the extracted noise signal;
perform a discrete transform with respect to the audio frame;
generate log power spectrum data of the discrete transform; and
input the log power spectrum data to the second machine learning system as the audio features of the extracted noise signal.

17. The computer system of claim 10, wherein:
the first machine learning system includes at least a first deep neural network; and
the second machine learning system includes at least a second deep neural network.

18. The computer system of claim 10, wherein the at least one computer processor is further configured to:
determine a value of 'b' such that $E_t[y(t)-bs'(t))^2]$ is minimized,
where,
t represents time,
y(t) represents the audio input with respect to the time,
s'(t) represents the clean speech signal with respect to the time, and
$E_t$ is an expectation operator with respect to the time; and
obtain the noise signal via n'(t)=y(t)−bs'(t) in which n'(t) represents the noise signal.

* * * * *

UNITED STATES PATENT AND TRADEMARK OFFICE
CERTIFICATE OF CORRECTION

PATENT NO. : 10,923,137 B2
APPLICATION NO. : 15/586876
DATED : February 16, 2021
INVENTOR(S) : Hasan al Banna It is certified that error appears in the above-identified patent and that said Letters Patent is hereby corrected as shown below:

In the Claims

In Claim 3, at Column 16, Line 59: "computer implemented" should read --computer-implemented--.

In Claim 5, at Column 17, Lines 3-4: "the at least one computer, processor" should read --the at least one computer processor--.

In Claim 9, at Column 17, Line 30: "bs'(t)" should read --b s'(t)--.

In Claim 9, at Column 17, Line 40: "bs'(t)" should read --b s'(t)--.

In Claim 18, at Column 18, Line 49: "bs'(t)" should read --b s'(t)--.

In Claim 18, at Column 18, Line 59: "bs'(t)" should read --b s'(t)--.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*